United States Patent [19]

Kuo

[11] Patent Number: 4,712,233
[45] Date of Patent: Dec. 8, 1987

[54] MONOLITHIC TELEPHONE SUBSCRIBER LINE INTERFACE CIRCUIT

[75] Inventor: James R. Kuo, Cupertino, Calif.

[73] Assignee: Fairchild Camera & Instrument Corp., Mountain View, Calif.

[21] Appl. No.: 725,461

[22] Filed: Apr. 22, 1985

[51] Int. Cl.$^4$ ............................................. H04M 3/22
[52] U.S. Cl. .................................... 379/386; 379/399; 379/286
[58] Field of Search ....... 179/18 FA, 16 EA, 16 AA, 179/81 R, 84 R, 84 VF, 99 R, 18 HB, 18 EB; 379/352, 386, 18, 405, 399, 339, 373, 341, 286, 281, 280; 375/94

[56] References Cited

U.S. PATENT DOCUMENTS

| | | | |
|---|---|---|---|
| 3,927,264 | 12/1975 | Fish et al. | 179/2 A |
| 4,451,703 | 5/1984 | Brightman et al. | 179/18 FA |
| 4,473,719 | 9/1984 | Embree et al. | 179/18 FA |
| 4,540,853 | 9/1985 | Albouy | 179/18 FA |
| 4,570,034 | 2/1986 | Serrano | 179/84 A |

FOREIGN PATENT DOCUMENTS

0133806  10/1979  Japan .............................. 179/16 EA

OTHER PUBLICATIONS

Linear Applications, vol. 1, Radio Shack Cat No. 62-1373, T. M. Frederikson et al., Sep. 1972, pp. 72-1-72-4 and 72-30.
Signetics Digital, Linear and MOS, Signetics Corporation, 1972, pp. 6-142, 6-164, and 6-169.

*Primary Examiner*—Gene Z. Rubinson
*Assistant Examiner*—R. Vaas
*Attorney, Agent, or Firm*—Stephen J. Phillips; Lee Patch; Paul C. Haughey

[57] ABSTRACT

The present invention is an improved subscriber line interface circuit which allows fast detection of an off-hook signal in the presence of a ringing signal during an answer mode while also permitting fast detection of dialing pulses during a calling mode. A programmable filter is used in the supervision circuit of the SLIC to allow the cutoff frequency of the filter to be varied so that the 20 Hz ringing signal will be attenuated during a ringing sequence and dialing pulse rates up to 20 Hz will be passed by the filter during the calling mode. A clamping amplifier is used to clamp the received signal to a maximum of 1.5 times the loop threshold current. This eliminates the large variations in the rise and fall times of the pulse dialing signal due to variations in the loop current caused by varying impedances of the telephone line. The filter is programmed by using an analog switch to bypass certain filter elements. The analog switch is a voltage-follower amplifier which has a current source which is disabled when the switch is to be opened.

9 Claims, 8 Drawing Figures

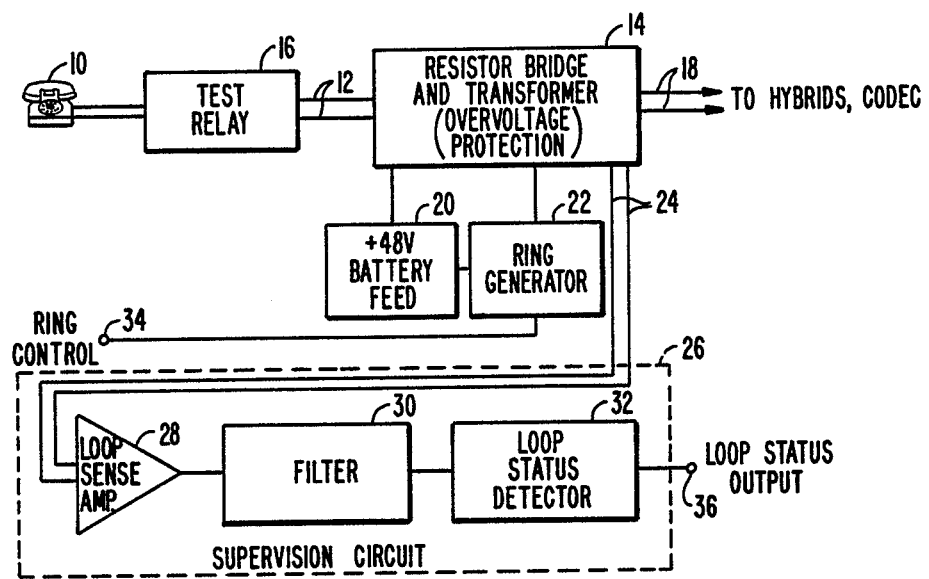
FIG._1. (PRIOR ART)
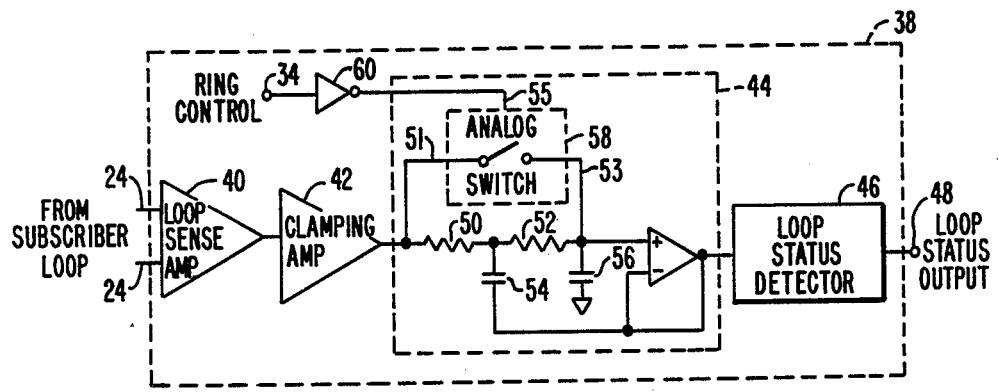
FIG._2.

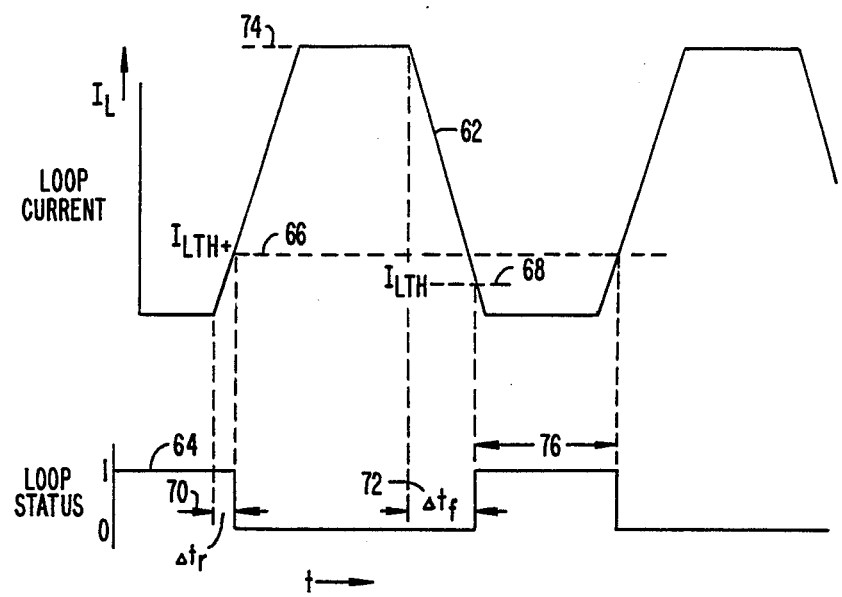
FIG._3A.
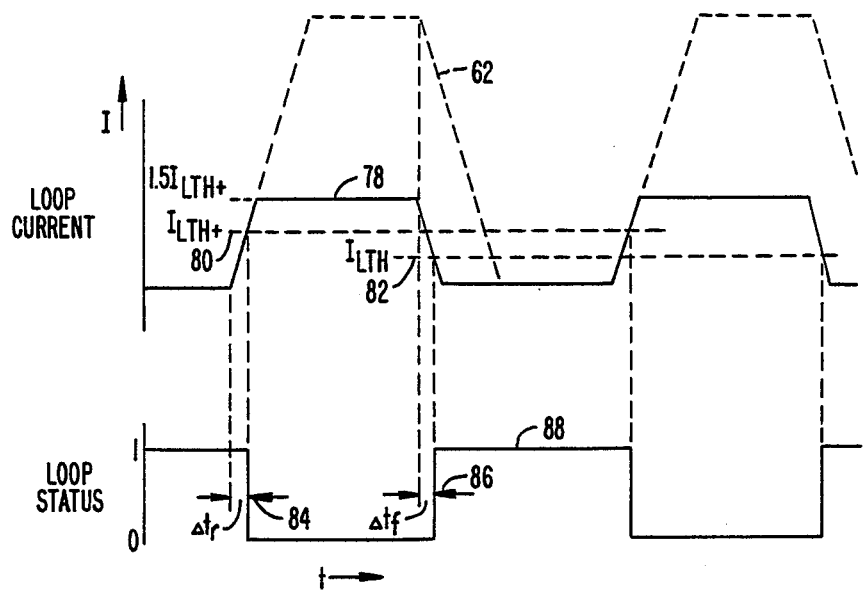
FIG._3B.

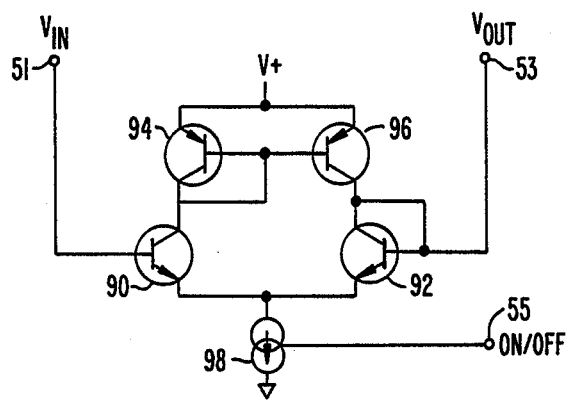
FIG._4.
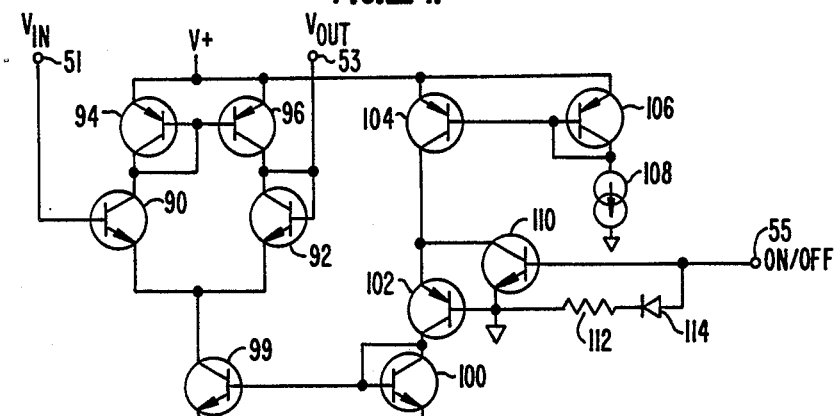
FIG._5.
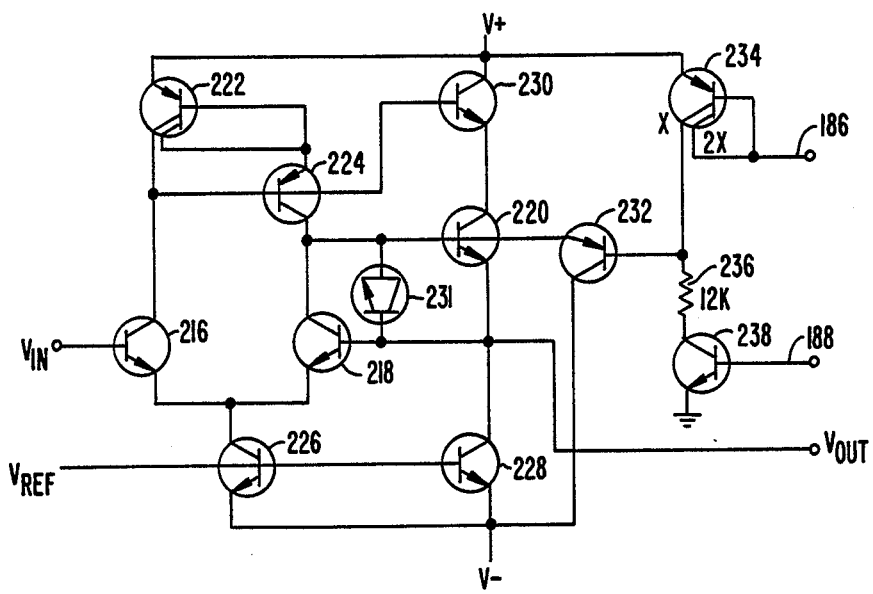
FIG._7.

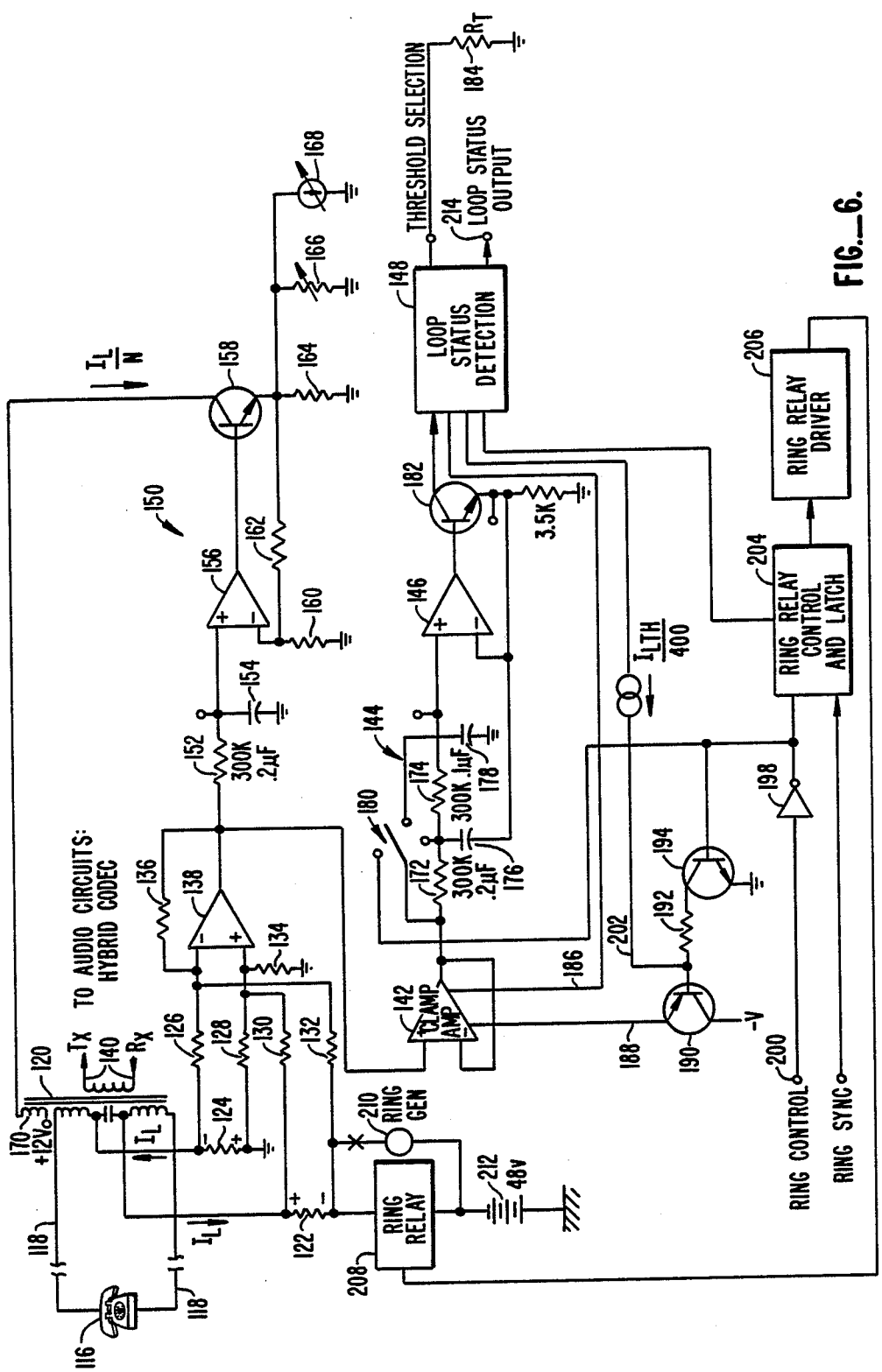
FIG._6.

MONOLITHIC TELEPHONE SUBSCRIBER LINE INTERFACE CIRCUIT

BACKGROUND OF THE INVENTION

This invention relates to an improved supervision circuit in a subscriber line interface circuit (SLIC). A SLIC is the interface circuit between a local telephone company central office (exchange) and an individual telephone (the "local loop"). The SLIC is located at the central office. The basic requirements for an SLIC card are referred to as BORSCHT, an acronym for the following functions:

Battery—The SLIC must supply power to the subscriber telephone.

Over voltage protection—The SLIC must protect the central office circuitry against voltage transients.

Ringing—The SLIC must cause the subscriber telephone to ring.

Supervision—The SLIC must detect service requests (when the caller goes off-hook), detect dialing input signals, and supervise calls in progress (when a ring is answered or when one party hangs up).

Coding—The SLIC must convert the voice signal into serial digital codes that are placed into pulse code modulated time slots for digital transmission. A decoder is required at the other end of the transmission circuit. Both encoder and decoder are commonly combined into one integrated circuit called a codec.

Hybrid—The SLIC must convert a two-wire line from the subscriber telephone set to the four-wire line used for long distance communication.

Test—The SLIC must allow access for central office circuits to detect faults in the local loop.

Within a SLIC, a supervision circuit must provide certain functions. When an individual telephone is called (the answer mode), the central office, through the supervision circuit in the SLIC, provides a 20 Hz ringing signal to the called telephone. When the called party answers the telephone by lifting the receiver, the off-hook switch causes a switch to close in the telephone which allows a DC current from the battery supply at the central office to flow in the local loop. The central office detects that the telephone has been answered by this current flow. The supervision circuit must be able to detect the flow of DC current at the same time that the AC ringing current is present. The Bell Telephone and other company's standard requirement for such a circuit is that the DC current be detected sufficient quickly to enable the ringing signal to be removed within 200 milliseconds. This allows the ringing to be removed before the receiver is applied to the called party's ear.

The amount of the DC current in the local loop can vary widely. It depends on the central office exchange battery voltage, the current limiting resistance inserted into the loop at the exchange to limit short circuit current, the resistance of the local loop, and the resistance of the telephone set itself. Therefore the supervision circuit must be capable of detecting a wide range of DC currents but must not be so sensitive that leakage currents are detected as an off-hook condition. A loop threshold current is selected in light of these factors so that a DC current above the threshold is presumed to indicate an off-hook condition.

To detect the DC current in the presence of the 20 Hz ring signal, a low-pass filter is typically used to filter out the 20 Hz signal. The characteristics of the low-pass filter must be carefully chosen so that the change in DC current indicating an off-hook condition is detected within 200 milliseconds. This usually involves a compromise in the quality of the filter response.

When a call is initiated from a local telephone (calling mode), the supervision circuit must detect the off-hook condition and then detect the numbers entered. When dialing, a rotary telephone causes DC current to be interrupted by opening a switch, with the number of interruptions corresponding to the number dialed. The supervision circuit is required to detect these interruptions in the DC current due to dialing pulses. The mechanical inertia associated with a rotary dial telephone places an upper limit on the pulse rate of approximately 10-20 pulses per second (10-20 Hz). (Dual tone multi-frequency (DTMF) push button phones use the generation of alternating current tone frequencies, and not the interruption of DC current, and are interpreted by a separate circuit.)

The filter used to enable detection of an off-hook condition in the presence of the ringing signal inhibits the detection of dialing pulses because the dialing pulse rate can be very close to the 20 Hz ringing signal rate. Even where the pulse signals are not significantly attenuated by the filter, the rising and falling edges on the change in DC current are lengthened due to the presence of the filter. This degrades the detected dialing duty cycle and can result in errors. The degradation is aggravated by variations in line impedance which causes variations in the rise and fall times of the dialing pulse signals.

SUMMARY OF THE INVENTION

The present invention is an improved subscriber line interface circuit (SLIC) which allows fast detection of an off-hook signal in the presence of a ringing signal during an answer mode while also permitting fast detection of dialing pulses during a calling mode. A programmable filter is used in the supervision circuit of the SLIC to allow the cutoff frequency of the filter to be varied so that the 20 Hz ringing signal will be attenuated during a ringing sequence and dialing pulse rates up to 20 Hz will be passed by the filter during the calling mode. A clamping amplifier is used to clamp the received signal to a maximum of 1.5 times the loop threshold current. The clamp eliminates the large variations in the rise and fall times of the pulse dialing signal due to variations in the loop current caused by varying impedances of the telephone line. The duty cycle of the dialing pulse sequence is thus improved and the likelihood of missing a pulse due to a slow rise or fall time is significantly reduced.

Preferably, the programmable filter uses a switch to bypass certain filter elements when the subscriber telephone set is in the calling mode. A Butterworth active filter having two RC legs can be programmed by using a switch to bypass the two resistors and one of the capacitors. When the switch is open, the filter acts to eliminate the 20 Hz ringing signal and has a cutoff frequency somewhere slightly below 20 Hz. When the switch is closed, the two resistors and a capacitor are bypassed leaving only the second capacitor. This raises the cutoff frequency so that a dialing pulse rate up to 20 Hz will not be attenuated while unwanted higher frequency noise will still be eliminated.

Preferably, the switch is an analog switch. The analog switch consists of a pair of emitter coupled transistors forming an amplifier, with the output coupled to the non-inverting input to provide a voltage-follower configuration. A current source to the emitter coupled transistors is controlled through a disabling circuit by a control input. When the current source is operating, the input signal will be tracked by the output signal providing the same effect as though there were a direct electrical connection and thus acting like a closed switch. Upon an appropriate control input, the current source can be disabled, thereby disabling the voltage follower and creating the equivalent of an open circuit switch.

For a fuller understanding of the nature and advantages of the invention, reference should be made to the ensuring detailed description taken in conjunction with the accompanying drawings.

BRIEF DESCRIPTION OF THE DRAWINGS

FIG. 1 is a schematic diagram of a prior are subscriber line interface circuit.

FIG. 2 is a generalized schematic diagram of the preferred embodiment of the supervision circuit of the present invention.

FIGS. 3A and 3B are graphical representations of the loop current during a dialing pulse sequence in the prior art and the present invention, respectively.

FIG. 4 is a generalized schematic diagram of a preferred embodiment of the analog switch of the present invention.

FIG. 5 is a detailed schematic diagram of the circuit of FIG. 4.

FIG. 6 is a detailed schematic diagram of the circuit of FIG. 2.

FIG. 7 is a schematic diagram of a preferred embodiment of the clamping amplifier of FIG. 6.

DETAILED DESCRIPTION OF THE PREFERRED EMBODIMENTS

FIG. 1 is a block diagram of a standard subscriber line interface circuit. A subscriber's telephone set 10 is coupled through a two-wire local loop 12 to a resistor bridge and transformer 14. Test relays 16 allow access to the local loop lines 12 for testing. Output lines 18 go to circuits to provide the hybrid and codec functions (not shown) of the SLIC. A battery 20 supplies power to the local loop 12 and a ring generator 22. Ring generator 22 provides a ringing signal to local loop 12 through resistor bridge and transformer 14. Lines 24 coupled to resistor bridge and transformer 14 provide the current from local loop 12 to a supervision circuit 26.

Supervision circuit 26 has at its input a loop sense amplifier 28. The output of amplifier 28 is passed through a filter 30 and into a loop status detection circuit 32.

In operation, when a telephone set 10 is to be rung, a ring control 34 turns on ring generator 22 applying a 20 Hz ring signal through local loop 12 to telephone set 10. Filter 30 eliminates the 20 Hz ringing signal from the input to loop status detection circuit 32 but allows loop status detector 32 to detect the DC off-hook current in local loop 12 when the receiver of telephone set 10 is lifted off-hook. A loop status output 36 provides this detection signal.

In the calling mode, a series of dialing pulses from telephone 10 will pass through supervision circuit 26 to provide a digital output at loop status output 36. The components of filter 30 are chosen to filter out the 20 Hz ring signal as much as possible during the answer mode while still allowing the dialing pulse signal to pass through the filter during the calling mode. The detection of dialing pulses is further complicated because the output of amplifier 28 may vary widely due to varying impedances of local loop 12. Filter 30 causes these variations in signal height to result in different duty cycles of the signal at output 36 due to the effect of the filter on the rise and fall times of the dialing pulse signals.

FIG. 2 shows the preferred embodiment of a supervision circuit 38 of the present invention. Supervision circuit 38 replaces supervision circuit 26 of FIG. 1 in a standard subscriber line interface card. Input lines 24 connect to a loop sense amplifier 40. The signal is then processed through a clamping amplifier 42 and a filter 44. A loop status detector 46 then provides a loop status output 48. Filter 44 includes a pair of resistors 50, 52 and capacitors 54, 56. A switch 58 is used to bypass resistors 50, 52 and capacitor 54. Switch 58 is controlled by ring control signal 34. In operation, during a ringing sequence, the ring control signal is inverted by an inverter 60 allowing switch 58 to remain open. The 20 Hz ring signal is attenuated by filter 44 allowing the DC off-hook current to be detected by loop status detector 46.

When no ringing signal is being applied, the ring control signal is off and is inverted by inverter 60 to close switch 58. When switch 58 is closed, resistors 50, 52 and capacitor 54 are bypassed, thereby programming filter 44 to only include capacitor 56. As reprogrammed, filter 44 will allow a dialing pulse sequence up to approximately 20 Hz to pass through to loop status detector 46 without significant attenuation. At the same time, capacitor 56 causes unwanted higher frequency noises to be filtered out. Clamping amplifier 42 limits the input signal to filter 44 to 1.5 times the loop current threshold. The loop current threshold is the minimum amount of current required to indicate an off-hook condition. Supervision circuit 38 thus provides quick detection of dialing pulses and prevents any significant degradation of the dialing pulse duty cycle.

The operation of clamping amplifier 42 can be understood by referring to FIGS. 3A and 3B. FIG. 3A shows the loop current signal 62 which passes through amplifier 30 to loop status detector 32 of the prior art circuit of FIG. 1. A loop status output signal 64 from output 36 is also shown. The amplitude of loop current signal 62 varies with the impedance in the local loop 12 and is shown in FIG. 3A for relatively high value of loop current. A loop current positive threshold 66 is the value the DC current is required to exceed to indicate an off-hook condition or the absence of a dialing pulse. When a telephone receiver is put back on-hook, or a dailing pulse is transmitted, the loop current is interrupted and a negative loop current threshold 68 is used to indicate the removal of the loop current. Thus, any current less than the value of negative loop current threshold 68 is presumed to be a leakage current. The negative threshold is preferably half the positive threshold, with typical values of 9 mA and 18 mA, respectively.

Interval 70 shows the rise time of signal 62 which corresponds to the time between when a subscriber telephone circuit is closed (indicating the receiver being lifted off-hook or the end of a dialing pulse) and the time at which the positive loop current threshold is reached, causing loop status output 64 to change state. Interval 72 corresponds to the time between opening of the loop circuit at the subscriber telephone (indicating the receiver being placed on-hook or the beginning of a dialing pulse) and the time at which the loop current negative threshold 68 is reached. Fall time 72 will vary with the maximum amplitude 74 of signal 62. Rise time 70 will remain constant as long as the maximum level 74 is greater than positive threshold 66. This results in degrading the duty cycle of loop status output 64 and could result in a pulse, represented by interval 76 of the loop status output, not being detected at all if fall time 72 is large enough.

FIG. 3B shows a loop current signal 78 as it appears at the output of filter 44 of FIG. 2. The equivalent signal 62 for the output of filter 30 of FIG. 1 is shown in phantom. Signal 78 is clamped to a maximum level 79 equal to 1.5 times a loop current threshold 80. Thus, if a negative loop current threshold 82 is one-half of positive current threshold 80, rise time 84 will be equal to fall time 86 because each corresponds to a change in current equal to ⅔ of clamping level 79. The duty cycle of a loop status signal 88 is thus improved and will remain constant regardless of the value of the loop current so long as the loop current is more than 1.5 times positive loop current threshold 80.

Turning now to FIG. 4, there is shown a preferred embodiment of switch 58 of FIG. 2. Input 51 and output 53 correspond to inputs 51 and 53 of FIG. 2. An on-off signal 55 corresponds to line 55 of FIG. 2. Input 51 is connected to the base of a transistor 90 which is one transistor of an emitter-coupled transistor pair 90, 92. Transistors 94, 96 provide current to the collectors of emitter-coupled transistors 90, 92. A current source 98 provides current for the emitters of transistors 90, 92. The collector of transistor 92 is connected to its base to provide feedback from the output giving a voltage-follower configuration. Thus, the voltage appearing on input 51 will be tracked by the voltage on output 53, resulting in the same effect as if a physical switch had closed a connection between input 51 and output 53. An on-off signal can be applied to control 55 to turn off current source 98, thereby disabling the circuit and creating the equivalent of an open circuited switch between input 51 and output 53.

FIG. 5 shows a preferred embodiment of analog switch 58 of FIG. 2 in more detail. Inputs 51 and 53 are provided as well as emitter-coupled transistors 90, 92. Additionally, there is shown transistors 94, 96 to provide current to the collectors of transistors 90, 92. A current source transistor 99 provides current to the emitters of emitter-coupled transistors 90, 92.

The base of transistor 99 is coupled to the base of a transistor 100. Transistor 100 has its base coupled to its collector and its collector coupled to the collector of a PNP transistor 102. The current to the emitter of transistor 102 is provided by a current source transistor 104. Transistor 104 is coupled to a transistor 106 which has its collector coupled to a current source 108 and its collector is also coupled back to its base. Current source 108 provides the current to turn on transistors 104 and 106, thereby providing a current flow to transistor 102. Transistor 102 provides the current to transistor 100, which, by virtue of having its base coupled to its collector, provides the base current for transistor 99.

A transistor 110 is provided to bypass transistor 102, thereby eliminating the current from transistors 100 and 98. Control line 55 is coupled to the base of transistor 110. When the signal on control line 55 goes high, transistor 110 is turned on, thereby effectively short-circuiting the emitter and base of transistor 102. Thus, the current from transistor 104 will flow through transistor 110 to ground and bypass transistor 102. This results in transistor 100 being turned off which in turn turns off transistor 98 and creates the equivalent of an open circuit switch between input 51 and output 53. A resistor 112 and a diode 114 are provided to ensure that transistor 110 turns on quickly when the signal on line 55 goes high.

This analog switch can be used in other applications as well, such as analog to digital or digital to analog converters and sample and hold integrated circuits.

FIG. 6 shows the supervision circuit of FIG. 2 in more detail. A subscriber telephone 116 is coupled via a local loop 118 to a transformer 120. The loop current from transformer 120 passes through a series of resistors 122, 124, 126, 128, 130, 132, 134, 136, and through a loop sense amplifier 138. A pair of lines 140 from the other side of transformer 122 proceed to the audio circuits which perform the hybrid and codec functions (not shown). The output of loop sense amplifier 138 is fed to a clamping amplifier 142, through a filter 144, and a voltage to current converter 146 to a loop status detection circuit 148.

The output of loop sense amplifier 138 is also provided to a voltage to current converter 150 via a low pass filter composed of resistor 152 and capacitor 154. Voltage to current converter 150 includes an amplifier 156, transistor 158, resistors 160, 162 and 164, and variable resistor 166 and current source 168. Voltage to current converter 150 provides feedback to transformer 120 through a winding 170 to cancel the DC flux generated by the line current from line 118. Current source 168 is a bipolar current source which is independent of temperature and supply voltages. The ratio (N) of the flux cancellation current to the telephone line loop current on line 118 is:

$$N = [2(R124*R136)/(R126*R164)]\left[1 + \frac{R162}{R160}\right]$$

Resistors 122, 124 are preferably 200 ohm resistors and resistors 126, 128, 130 and 132 are preferably 256 Kohm resistors.

The output of clamping amplifier 142 is coupled to a filter 144 composed of resistors 172, 174 and capacitors 176, 178. Filter 144 is programmable via an analog switch 180 as discussed earlier. The output of voltage to current converter 146 is coupled to a transistor 182 to provide a current to loop status detector 148 for comparison with a loop threshold current which is set by a threshold resistor 184. Preferably, the current threshold level is set at 18 milliamps for the positive-going threshold and 9 milliamps for the negative-going threshold.

Loop status detector 148 provides a pair of feedbacks 186, 188 to clamping amplifier 182. Feedback 186 provides the threshold current to clamping amplifier 142 and feedback 186 provides the clamping voltage level. Feedback line 186 is coupled through a transistor 190, a resistor 192, a second transistor 194, and an inverter 198 to a ring control input 200. When the ring control signal is high, inverter 198 provides a low signal to the base of transistor 194, turning it off and thereby turning off transistor 190 to provide a clamping voltage level to clamping amplifier 142 via line 188. Line 202 provides a current equal to the loop current threshold divided by 400 to ensure that the output of clamping amplifier 142 is clamped to 1.5 times the loop threshold.

The output of inverter 198 is also coupled to ring relay control and latch 204 and ring relay driver 206. When the ring control signal on input 200 is high, the signal proceeds through relay control 204 and relay driver 206 to activate a ring relay 208, thereby connecting a ring generator 210 via the intermediate resistors to local loop 118. Ring generator 210 is in series with a 48-volt battery 212 which provides the DC current to the local loop 118. In addition, when the ring control goes high, initiating the ring sequence, analog switch 180 is disconnected enabling filter 144 to filter the ringing signal.

In operation, when a telephone 116 is to be rung, ring control 200 presents a high signal to inverter 198 which causes ring generator 210 to provide a ringing signal. At the same time, analog switch 180 is disconnected so that the ringing signal which is propagated through loop sense amplifier 136 and clamping amplifier 142 (which is not clamped at this time) allowing voltage-to-current converter 146 to detect a DC loop current upon telephone 116 going off-hook. A loop status output 214 provides a signal when such an off-hook condition is detected. Loop status 214 will present a logic zero to represent such an off-hook condition.

In the absence of a logic high on ring control 200, analog switch 180 is enabled (closed), thereby bypassing resistors 172, 174 and capacitor 176. Ring generator 210 is turned off at this point and clamping amplifier 142 is clamped to 1.5 times the positive loop current threshold set by resistor 184 ($R_T$). In this mode, dialing pulses are clamped to prevent degradation of the duty cycle, and filter 144 has been reprogrammed to pass the dialing pulse signal.

Clamping amplifier 142 is shown in more detail in FIG. 7. The amplifier includes emitter-coupled transistors 216, 218 and output transistor 220, a Wilson current source composed of transistors 222, 224 and current source transistors 226, 228. A transistor 230 is coupled so as to balance the current drawn from transistor 224 by output transistor 220, thereby eliminating any offset voltage as described below. A transistor diode 231 is connected as a frequency compensating capacitor to couple the base and collector of transistor 218.

The base of output transistor 220 is coupled to a PNP transistor 232 to provide the clamping function. The base of transistor 232 is fed by a transistor 234 having two collectors. A first collector is coupled to the base of transistor 232 and a second collector, which provides twice the current of the first collector, is coupled back to the base of transistor 234. Input 186 provides a threshold current $I_{TH}/400$ from loop status detector 148 of FIG. 6 to the base of transistor 234. The output may be clamped to a voltage equal to 1.5 times the threshold voltage by a resistor 236 and a transistor 238. A logic high on input 188 will turn on transistor 238, causing current to flow through transistor 236 and establishing a voltage drop which sets the clamping voltage level at the base of transistor 232. This voltage level is applied through transistor 232 to transistor 220 and to the voltage output.

The clamping amplifier includes an improved active load described in detail in my copending application Ser. No. 06/715,848 filed 3/25/85 U.S. Pat. No. 4,629,997. The active load is transistors 222, 224 and 230. The base of transistor 230 is coupled to the collector of transistor 216 while the base of transistor 230 is coupled to the collector of transistor 218. Because the same load current flows through transistor 230 and transistor 220, provided that the transistors have identical characteristics, their base currents will be substantially identical. Thus, the current drawn from the collector of transistor 218 to the base of output transistor 220 will be matched by an equal current drawn from the collector of transistor 216 to the base of transistor 230.

Thus, the currents into the collectors of the two emitter-coupled transistors 216, 218 remain substantially identical regardless of the load current. This results in the offset voltage being very small. In addition, the impedance looking into the base of output transistor 220 from the input stage is very large because the balancing of the current has the same effect as no current flowing into the base of the output transistor. Thus, a very high gain is achieved. By using a Wilson current source to supply the current to the collectors of emitter-coupled transistors 216, 218, a very high impedance looking into the current source is achieved thereby enhancing the performance of the amplifier.

As will be understood by those familiar with the art, the present invention may be embodied in other specific forms without departing from the spirit or sense of characteristics thereof. For example, filter 44 of FIG. 2 can be configured in other specific forms to provide the desired function. For instance, more than one switch 58 could be used or the switch could couple to the middle of a resistor or any other convenient location. Accordingly, the disclosure of the preferred embodiment of the invention is intended to illustrative, but not limiting, of the invention which is set forth in the following claims.

What is claimed is:

1. In a supervision circuit of a subscriber line interface circuit coupled to a subscriber line and having a filter, the improvement comprising:
   means for detecting dialing pulses with a predetermined positive—going threshold and a predetermined negative—going threshold of approximately one-half said positive—going threshold; and
   a clamping amplifier for clamping positive—going signals on said subscriber line to approximately 1.5 times said predetermined positive—going threshold.

2. The circuit of claim 1 wherein said clamping amplifier comprises:
   first and second coupled transistors, each having a base, an emitter and a collector, said emitters being coupled together;
   an output transistor having a base coupled to said collector of said second transistor;
   a PNP transistor having an emitter coupled to a base of said output transistor; and
   means for applying a voltage to a base of said PNP transistor proportional to approximately 1.5 times said threshold current.

3. In a supervision circuit of a subscriber line interface circuit having means for detecting an off-hook condition of a subscriber and dialing pulses, the improvement comprising:
   a programmable filter having a first mode for attenuation of a ringing signal and adaptable to a second mode, responsive to detection of said off-hook condition, for providing said dialing pulses to said detecting means without significant attenuation.

4. The circuit of claim 3 further comprising a switch coupled to bypass a portion of said filter in said second mode.

5. The circuit of claim 4 wherein said filter is an active filter comprising:

an amplifier having an inverting input, a noninverting input and an output;

a first resistor coupled at a first lead to said noninverting input of said amplifier;

a first capacitor coupled between said first lead of said first resistor and a ground;

a second resistor coupled between a second lead of said first resistor and an input to said active filter; and a second capacitor coupled between said second lead of said first resistor and said output of said amplifier;

said switch being coupled between said input to said active filter and said noninverting input of said amplifier.

6. The circuit of claim 4 wherein said switch is an analog switch comprising:

a voltage follower amplifier including a current source; and means for disabling said current source when said switch is to be opened.

7. The circuit of claim 4 wherein said switch is an analog switch comprising:

first and second transistors, each having a base, an emitter and a collector, said emitters being coupled together, said base of said first transistor being a first contact of said switch and said base of said second transistor being a second contact of said switch;

current source means for supplying substantially equal currents to each of said first and second transistors; and means for disabling said current source means when said switch is to be opened.

8. The circuit of claim 7 wherein said current source means comprises at least one current source transistor and said disabling means comprises means for cutting off the current flowing through a base of said current source transistor.

9. In a supervision circuit for a subscriber line interface circuit the improvement comprising:

means for detecting dialing pulses with a predetermined positive—going threshold and a predetermined negative—going threshold of approximately one-half said positive—going threshold;

clamping amplifier means for clamping a signal from a subscriber line to approximately 1.5 times said predetermined positive—going threshold;

a programmable filter having a first mode for attenuation of a ringing signal from said subscriber line and adaptable to a second mode, responsive to detection of an off-hook condition, for passing said dialing pulses without signficant attenuation; and an analog switch for short-circuiting a portion of said filter upon detection of said off-hook condition.

* * * * *